United States Patent [19]

Shori

[11] 4,449,418
[45] May 22, 1984

[54] GEARSHIFT DEVICE

[75] Inventor: Kaoru Shori, Fuji, Japan

[73] Assignee: Nissan Motor Company, Limited, Yokohama, Japan

[21] Appl. No.: 341,265

[22] Filed: Jan. 21, 1982

[30] Foreign Application Priority Data

Feb. 9, 1981 [JP] Japan .................................. 56-16956

[51] Int. Cl.³ .......................... G05G 5/06; G05G 9/12
[52] U.S. Cl. .................................. 74/475; 192/114 R
[58] Field of Search ....................... 74/475; 192/114 R

[56] References Cited

U.S. PATENT DOCUMENTS 3,971,265  7/1976  Kurisu ................................... 74/475

Primary Examiner—Allan D. Herrmann
Attorney, Agent, or Firm—Lane, Aitken & Kananen

[57] ABSTRACT

A gearshift device for a manually operable transmission unit having a transmission case housing gears therein is disclosed as comprising a control rod having a center axis and movable along the center axis thereof with respect to the transmission case, a control lever securely mounted on the control rod and having a free end portion, and a shift fork having a pivot axis fixed with respect to the transmission case and pivotable about the pivot axis, the shift fork having one end portion bifurcated for forming a pair of protrusions and a recess between the protrusions, the free end portion of the control lever being received in the recess, the shift fork having the other end portion operably connected to the gears of the transmission unit, wherein the free end portion of the control lever and one of the protrusions are respectively formed with flat surfaces contactable with each other when the gears of the transmission unit are held in mesh with one another.

4 Claims, 6 Drawing Figures ered gearshift device in FIG. 2 and thus
GEARSHIFT DEVICE

FIELD OF THE INVENTION

The present invention relates to a gearshift device for a manually operable transmission unit.

SUMMARY OF THE INVENTION

In accordance with the present invention, there is provided a gearshift device for a manually operable transmission unit having a transmission case housing gears therein, comprising: a control rod having a center axis and movable along the center axis thereof with respect to the transmission case, a control lever securely mounted on the control rod and having a free end portion, and a shift fork having a pivot axis fixed with respect to the transmission case and pivotable about the pivot axis, the shift fork having one end portion bifurcated for forming a pair of protrusions and a recess between the protrusions, the free end portion of the control lever being received in the recess, the shift fork having the other end portion operably connected to the gears of the transmission unit, wherein the free end portion of the control lever and one of the protrusions are respectively formed with flat surfaces contactable with each other when the gears of the transmission unit are held in mesh with one another. The flat surfaces of the free end portion of the control lever and the protrusion of the shift fork may be substantially in parallel with the center axis of the control rod when the flat surface of the free end portion of the control lever is brought into face-to-face contact with the flat surface of the protrusion of the shift fork. The flat surfaces of the free end portion of the control lever and the protrusion of the shift fork may be inclined with respect to the center axis of the control rod when the flat surface of the free end portion of the control lever is brought into face-to-face contact with the flat surface of the protrusion of the shift fork. The free end portion of the control lever may be spherically formed and truncated for forming the flat surface thereon.

BRIEF DESCRIPTION OF THE DRAWINGS

The drawbacks of the prior-art gearshift device for a manually operable transmission unit and the features and advantages of a gearshift device for a manually operable transmission unit according to the present invention will be more clearly understood from the following description taken in conjunction with the following drawings in which.

DESCRIPTION OF THE PRIOR-ART

Figure 1:
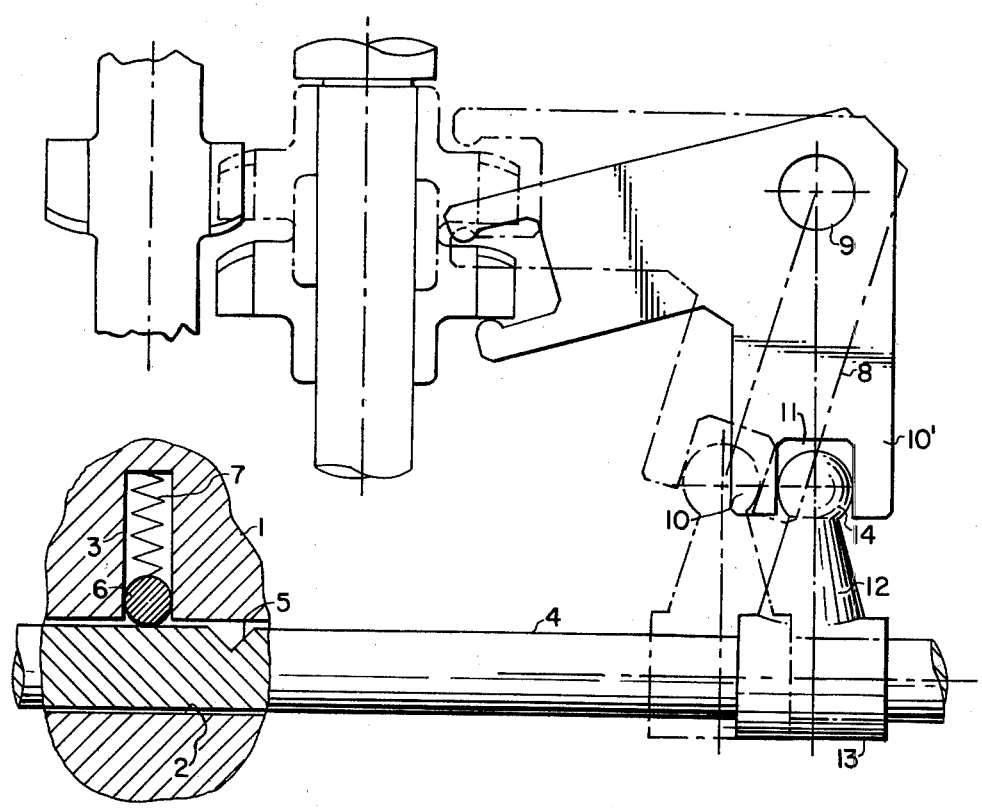
FIG. 1 is a fragmentary side view, partly in cross section, of a prior-art gearshift device and showing representative gears in phantom.
Figure 2:
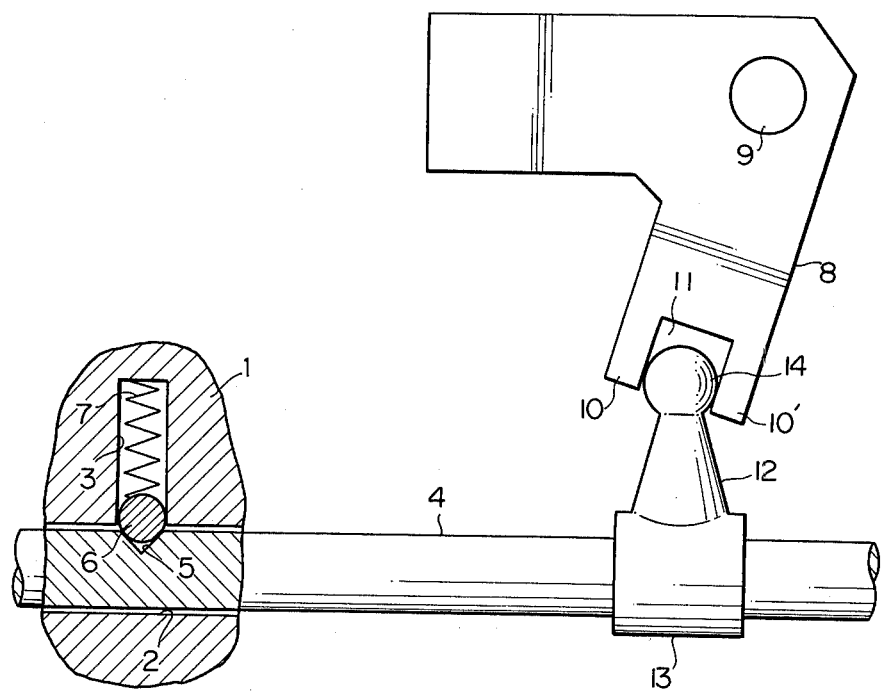
FIG. 2 is a fragmentary side view similar to FIG. 1 but showing the shifted condition where a control rod forming part of the gearshift device is caused to move along the center axis thereof.

A representative gearshift device for a manually operable transmission unit is shown in FIGS. 1 and 2. The gearshift device herein shown comprises a transmission case 1 formed with a guide bore 2 and a recess 3 open to the guide bore 2, a control rod 4 movable in and guided by the guide bore 2 along the center axis thereof and formed with a generally V-shaped notch 5 to be engageable with a steel ball 6 housed in the recess 3 and at all times biased by a compression coil spring 7 also housed in the recess 3, and a generally L-shaped shift fork 8 having a pivot axis 9 fixed to the transmission case 1 and pivotable about the pivot axis 9. The shift fork 8 has one end portion bifurcated for forming a pair of protrusions 10 and 10' and a recess 11 between the protrusions 10 and 10'. A control lever 12 has a boss portion 13 securely mounted on the control rod 4 and a spherical free end portion 14 received in the recess 11 of the shift fork 8. The shift fork 8 has the other end portion formed with a recess or projection to be operatively connected directly or through a suitable mechanical linkage to gears of the transmission unit, representatively shown in phantom lines.

The gearshift device assumes a position as shown by solid lines in FIG. 1 wherein the gears of the transmission unit are not held in mesh with one another so that the transmission torque is not transmitted through the gears. From these conditions, a shift lever (not shown) is operated by a driver to cause the control rod 4 to move in a left direction in FIGS. 1 and 2 so that the shift fork 8 is clockwisely pivoted about the pivot pin 9 to cause the gears of transmission unit to be brought into meshing engagement with one another, as will be seen by the phantom lines in FIG. 1 and from FIG. 2. This enables the gears to transmit the torque therethrough. At this time, the notch 5 in the control rod 4 is engaged with the steel ball 6 resiliently urged by the compression coil spring 7 so that the control rod 4 is locked and thus precluded from moving along the center axis thereof. This causes the gears of the transmission unit to be held in mesh with one another and to be prevented from disengagement from one another. If the reaction force from the gears of the transmission unit causes the shift fork to anticlockwisely pivot about the pivot axis 9, the reaction force is transmitted through the protrusion 10 of the shift fork 8 and the free end portion 14 of the control lever 12 to the control rod 4. The reaction force is thus applied to urge the control rod 4 in the rightward direction of the gearshift device in FIG. 2 and thus tends to disengage the steel ball 6 from the notch 5 of the control rod 4. As a consequence, the gears of the transmission unit are liable to be disengaged from one another in operation.

In order to avoid such disengagement of the gears of the transmission unit in the conventional gearshift device as described in the above, the spring strength of the compression coil spring 7 is required to be increased, thereby increasing the resistance force of the control rod 4 against the axial movement thereof by the steel ball 6 when the gears of the transmission unit are held in mesh with one another. However, the increased resistance force of the control rod 4 renders it extremely laborious to manipulate the shift lever by a driver, thereby deteriorating controllability of the shift lever. If, inversely, the spring strength of the compression coil spring 7 is decreased so as to reduce the resistance force of the control rod 4 for enhancing the controllability of the shift lever, the gears of the transmission unit which are in meshing relationship to one another are liable to be disengaged from one another. Problems are therefore encountered in that the conventional gearshift device is unable to meet the requirements for the two performances in excellent controllability of the shift lever and in prevention of the gears from disengagement out of one another.

The present invention contemplates provision of useful solutions to these problems which have been inherent in the prior-art gearshift device of the described natures.

DESCRIPTION OF THE PREFERRED EMBODIMENTS

Figure 3:
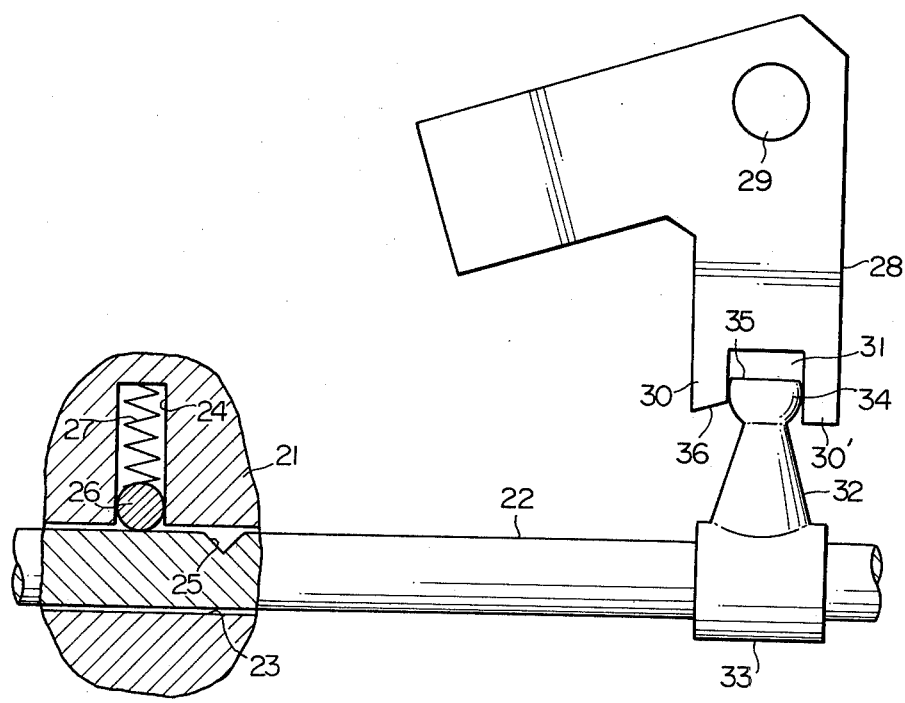
FIG. 3 is a fragmentary side view, partly in cross section, of a first embodiment of a gearshift device according to the present invention.
Figure 4:
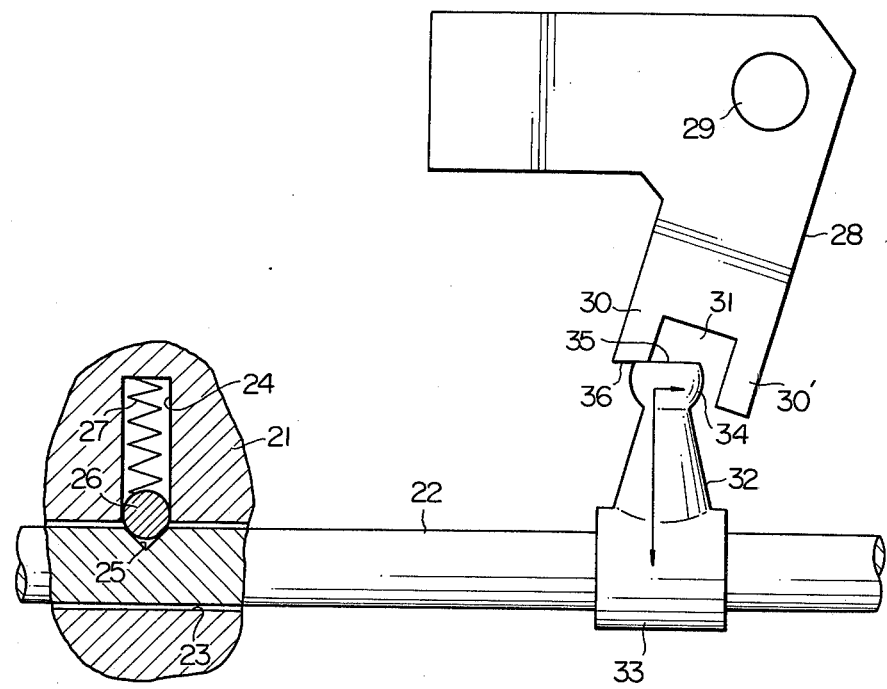
FIG. 4 is a fragmentary side view similar to FIG. 3 but showing the shifted condition where a control rod forming part of the gearshift device is caused to move along the center axis thereof.

FIGS. 3 and 4 of the drawings show a first preferred embodiment of the gearshift device according to the present invention aiming at provision of such solutions.

Referring first to FIGS. 3 and 4, the gearshift device embodying the present invention is shown comprising a transmission case 21 for housing gears (not shown) to provide forward, reverse and neutral conditions to a transmission unit (not shown), and a control rod 22 having a center axis and movable along the center axis thereof with respect to the transmission case 21. The transmission case 21 is formed with a guide bore 23 and a recess 24 open to the guide bore 23 by which the control rod 22 is guided. The control rod 22 is formed with a generally V-shaped notch 25 to be engageable with a steel ball 26 housed in the recess 24 and at all times biased by a compression coil spring 27 also housed in the recess 24. A generally L-shaped shift fork 28 has a pivot axis 29 fixed to the transmission case 21 and is pivotable about the pivot axis 29. The shift fork 28 has one end portion bifurcated for forming a pair of protrusions 30 and 30', and a recess 31 between the protrusions 30 and 30'. A control lever 32 has a boss portion 33 securely mounted on the control rod 22 and a spherical free end portion 34 received in the recess 31 of the shift fork 28, and the shift fork 28 has the other end portion formed with a recess or projection to be operatively connected directly or through a suitable mechanical linkage to gears of the transmission unit, as shown representatively in FIG. 1. According to the present invention, the free end portion 34 of the control lever 32 is spherically formed and truncated for forming a flat surface 35 thereon. Further, the protrusion 30 is likewise formed with a flat surface 36 which is contactable with the flat surface 35 of the truncated free end portion 34 of the control lever 32 when the control rod 22 is caused to move along the center axis thereof in the leftward direction in FIGS. 3 and 4, thereby bringing the gears of the transmission unit into mesh with one another. In the first embodiment of the gearshift device according to the present invention, the flat surfaces 35 and 36 of the free end portion 34 of the control lever 32 and the protrusion 30 of the shift fork 28 is substantially in parallel with the center axis of the control rod 22 when the flat surface 35 of the free end portion 34 of the control lever 32 is brought into face-to-face contact with the flat surface 36 of the protrusion 30 of the shift fork 28.

The operation of the gearshift device thus constructed in the above manner will be described hereinafter.

When the gearshift device is retained at a neutral position as shown in FIG. 3, the truncated free end portion 34 of the control lever 32 is received in the recess 31 of the shift fork 28 so that the gears of the transmission unit are being disengaged from one another and the transmission torque is thus not transmitted through the gears. From these conditions, a shift lever (not shown) is operated by a driver to cause the control rod 22 to move in the left direction in FIG. 3. The shift fork 28 is clockwisely pivoted about the pivot pin 29 until the flat surface 35 of the free end portion 34 of the control lever 32 is brought into face-to-face contact with the flat surface 36 of the protrusion 30 of the shift fork 28 as will be seen from FIG. 4. The pivotal movement of the shift fork 28 causes the gears of the transmission unit to be brought into meshing engagement with one another. This enables the gears to transmit the torque therethrough.

When the gears of the transmission unit are held in meshing engagement with one another, the notch 25 in the control rod 22 is engaged with the steel ball 26 resiliently urged by the compression coil spring 27 so that the control rod 22 is locked and thus precluded from moving along the center axis thereof. If the reaction force by the gears of the transmission unit is applied to cause the shift fork 28 to anticlockwisely pivot about the pivot axis 29, the reaction force is transmitted through the flat surfaces 35 and 36 of the free end portion 34 of the control lever 32 and the protrusion 30 of the shift fork 28 to the control rod 22. The reaction force has two components, i.e., a parallel component in parallel with the center axis of the control rod 22 and a perpendicular component perpendicular to the center axis of the control rod 22. The perpendicular component functions to reliably lock the control rod 22 in cooperation with the biasing force of the compression coil spring 27, while the parallel component is reduced to a relatively small value. This makes it possible to reduce the force to move the control rod 22 in a rightward direction in FIGS. 3 and 4, viz., in a direction in which the gears of the transmission unit are disengaged from one another in operation. The strength of the compression coil spring 27 can thus be reduced, resulting in reducing the resistance force of the control rod 22 against the axial movement thereof by the steel ball 26.

If, on the other hand, the gears are required to be disengaged from one another, the shift lever is manipulated by the driver to move the control rod 22 in a rightward direction against the biasing force of the compression coil spring 27. At this time, the steel ball 26 is disengaged from the notch 25 of the control rod 22 to bring the flat surface 35 of the free end portion 34 of the control lever 32 out of engagement with the flat surface 36 of the protrusion 30 of the shift fork 28. The disengagement between the flat surfaces 35 and 36 of the free end portion 34 of the control lever 32 and the protrusion 30 of the shift fork 28 is carried out smoothly since the flat surfaces 35 and 36 are substantially in parallel with the center axis of the control rod 22 when the gears of the transmission unit are held in mesh with one another. When the control rod 22 is caused to move further in the rightward direction of the gearshift device in FIG. 4 after the disengagement between the flat surfaces 35 and 36 of the free end portion 34 of the control lever 32 and the protrusion 30 of the shift fork 28, the protrusion 30' is rightwardly urged by the free end portion 34 of the control lever 32 so that the shift fork 28 is pivoted in a counterclockwise fashion about the pivot axis 29 to assume its neutral position in which the free end portion 34 of the control lever 32 is received in the recess 31 of the shift fork 28 as shown in FIG. 3. At this time, the gears of the transmission unit come to disengage from one another as in the prior-art gearshift device.

As a consequence, the shift lever can be manipulated by a driver without laborious tasks, thereby enhancing controllability of the shift lever. The gearshift device according to the present invention is able to meet the requirements for the two performances in excellent controllability of the shift lever and in prevention of the gears from disengagement out of one another.

Figure 5:
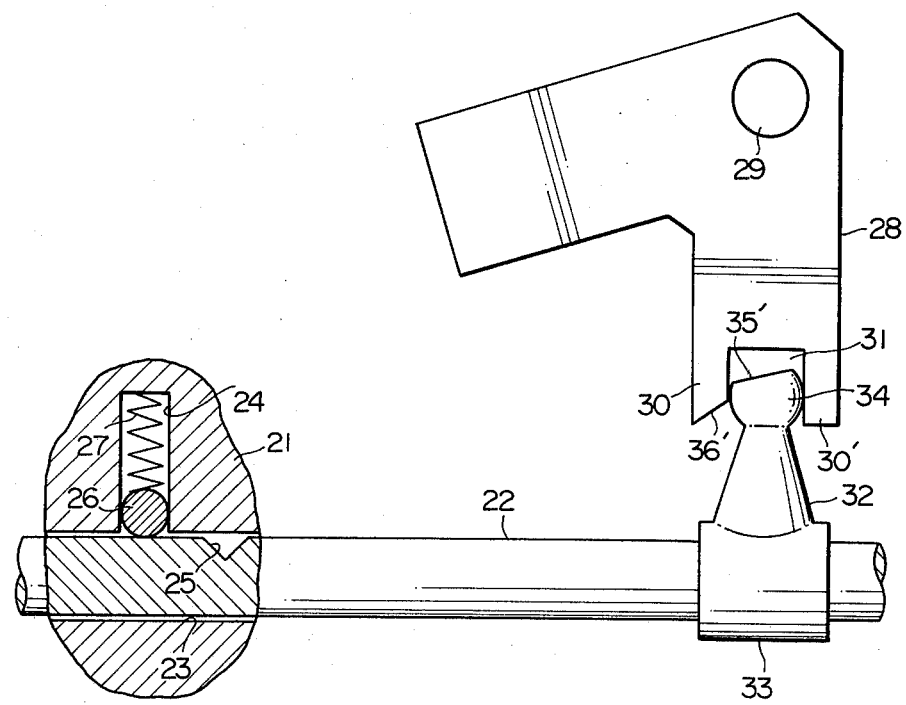
FIG. 5 is a fragmentary side view, partly in cross section, of a second embodiment of a gearshift device according to the present invention.
Figure 6:
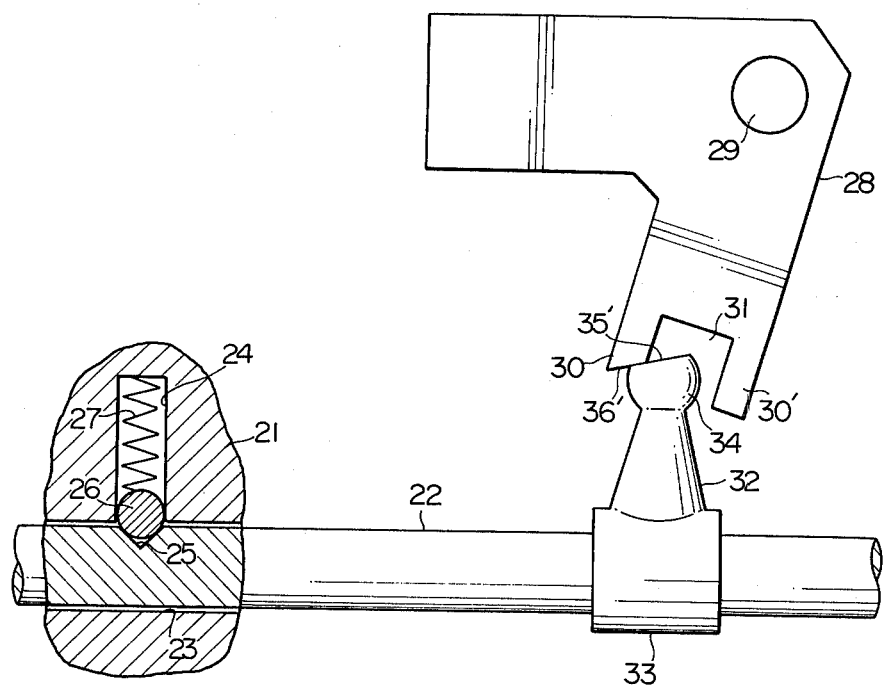
FIG. 6 is a fragmentary side view similar to FIG. 5, but showing the shifted condition where a control rod forming part of the gearshift device is caused to move along the center axis thereof.

With reference to FIGS. 5 and 6 of the drawings, there is shown a second embodiment of the gearshift device according to the present invention in which the flat surfaces 35' and 36' of the free end portion 34 of the control lever 32 and the protrusion 30 of the shift fork 28 are inclined with respect to the center axis of the control rod 22 when the flat surface 35' of the free end portion 34 of the control lever 32 is brought into face-to-face contact with the flat surface 36' of the protrusion 30 of the shift fork 28. Such inclination of the flat surfaces 35' and 36' of the free end portion 34 of the control lever 32 and the protrusion 30 of the shift fork 28 with respect to the center axis of the control rod 22 is determined in such a manner that the free end portion 34 of the control lever 32 is at all times reliably subjected to the reaction force by the gears of transmission unit. For the reasons similar to those of the first embodiment, the perpendicular component of the reaction force functions to reliably lock the control rod 22 in cooperation with the biasing force of the compression coil spring 27, while the parallel component is reduced to a relatively small value. This makes it possible to reduce the force to move the control rod 22 in a rightward direction in FIGS. 5 and 6, viz., in a direction in which the gears of the transmission unit are disengaged from one another in operation. Moreover, the flat surface 35' of the free end portion 34 of the control lever 32 can be readily disengaged from the flat surface 36' of the protrusion 30 of the shift fork 28 since the flat surfaces 35' and 36' are inclined with respect to the center axis of the control rod 22 when the flat surface 35' of the free end portion 34 of the control lever 32 is held in face-to-face contact with the flat surface 36' of the protrusion 30 of the shift fork 28. The strength of the compression coil spring 27 can thus be reduced, resulting in reducing the resistance force of the control rod 22 against the axial movement thereof by the steel ball 26.

As the other portions, members and elements of the second embodiment are substantially identical to those of the first embodiment, there will not be described about the construction and function of the portions, members and elements of the second embodiments which are merely indicated by the reference numerals sames as those of the first embodiment.

What is claimed is:

1. A gearshift device for a manually operable transmission unit having a transmission case housing gears therein, comprising:
   a control rod having a center axis and movable along the center axis thereof with respect to said transmission case,
   a control lever securely mounted on said control rod and having a free end portion, and
   a shift fork having a pivot axis fixed with respect to said transmission case and pivotable about the pivot axis, the shift fork having one end portion bifurcated for forming a pair of protrusions and a recess between the protrusions, the free end portion of said control lever being received in the recess, the shift fork having the other end portion operably connected to the gears of said transmission unit,
   wherein the free end portion of said control lever and one of said protrusions are respectively formed with flat surfaces contactable with each other when the gears of the transmission unit are held in mesh with one another.

2. A gearshift device as set forth in claim 1, in which the flat surfaces of the free end portion of said control lever and the protrusion of said shift fork are substantially in parallel with the center axis of said control rod when the flat surface of the free end portion of the control lever is brought into face-to-face contact with the flat surface of the protrusion of the shift fork.

3. A gearshift device as set forth in claim 1, in which the flat surfaces of the free end portion of said control lever and the protrusion of said shift fork are inclined with respect to the center axis of said control rod when the flat surface of the free end portion of the control lever is brought into face-to-face contact with the flat surface of the protrusion of the shift fork.

4. A gearshift device as set forth in claim 1, in which the free end portion of said control lever is spherically formed and truncated for forming said flat surface thereon.

* * * * *